INVENTOR.
RUSSELL R. LAW,
BY Robert Thompson
ATTORNEY.

Aug. 26, 1969 R. R. LAW 3,463,876

TV BANDWIDTH REDUCTION

Filed Nov. 22, 1966 4 Sheets-Sheet 2

United States Patent Office 3,463,876

Patented Aug. 26, 1969

3,463,876

TV BANDWIDTH REDUCTION

Russell R. Law, Malibu, Calif., assignor to Hughes Aircraft Company, Culver City, Calif., a corporation of Delaware Filed Nov. 22, 1966, Ser. No. 596,178
Int. Cl. H04n *7/00, 5/76;* H04b *1/66*
U.S. Cl. 178—6 29 Claims This invention relates generally to improvements in reduced bandwidth television systems and more particularly to improvements in recording and reproducing television signals.

In the television technology, it is sometimes desirable to reduce the bandwidth requirements of a television signal in order to make the signal compatible with the bandwidth limitations of some other medium such as a video tape recorder. One way to reduce the bandwidth requirements is to take advantage of the redundancy in the frame-to-frame video information and the ability of the human sight process to fill in missing information.

In this regard, in my copending patent application S.N. 563,763, entitled "Television Bandwidth Reduction," filed on July 8, 1966, a system is disclosed in which the video information is sampled and recorded in a select, evenly-spaced stable pattern that recurs every X lines. This sampled information is further divided into complementary sets of data with each separate set being recorded on a separate channel. For example, if two complementary sets of data were sampled, they would be recorded on two channels, and if four complementary sets of data were sampled, they would be recorded on four channels.

It is an object of this invention to provide improvements in means and method in processing sampled video data for recording thereof.

Another object is to provide means and method for reducing the bandwidth requirements of sampled video information in a unique manner so that when the video information is reproduced, it provides a high resolution picture.

Another object is to provide a means and method for increasing the resolution of sampled video information when reproduced.

Other objectives of this invention can be attained by providing in a system of the type having an encoder which samples a television luminance signal Y in a stable pattern characterized by evenly-spaced sampled data that is repeated every X lines. The sampled bits of data are fed sequentially through a plurality of parallel channels to a recorder operably coupled for recording the sampled data bits on a plurality of parallel recording channels. A decoder is operably coupled to receive played-back sampled data on a plurality of parallel channels and is operable to recombine the played-back sampled data into a reconstructed luminance signal Y. An improvement is provided therein of a recorder processor which is coupled to receive the plurality of channels of sampled data for reducing the instantaneous bandwidth requirements thereof by recording every other bit of sampled data, such as the odd-numbered bits, sequentially on a first and a second recording channel for one frame, and thereafter recording the even-numbered bits of sampled data on the first and the second channels during the next frame, and so forth. And a playback processor which is coupled to receive play-back sampled data signals from the recorder for utilizing each bit of played-back information twice—once as a real element without any delay and once as an artificial element after nearly a one-line delay to fill in otherwise blank information areas between real time data bits on the subsequent line, and then selectively feeding the real time information bits and the artificial information bits to a decoder on a plurality of channels where the information bits are reconstructed into a composite luminance signal.

Other objects, features and advantages of this invention will become apparent upon reading the following detailed description and referring to the accompanying drawings, in which.

FIG. *5a* and FIG. *5b* are graphical illustrations of a video picture area showing the relationship of the reduced video signal and the operation thereon by the playback processor for a first frame and the next frame, respectively.

Figure 1:
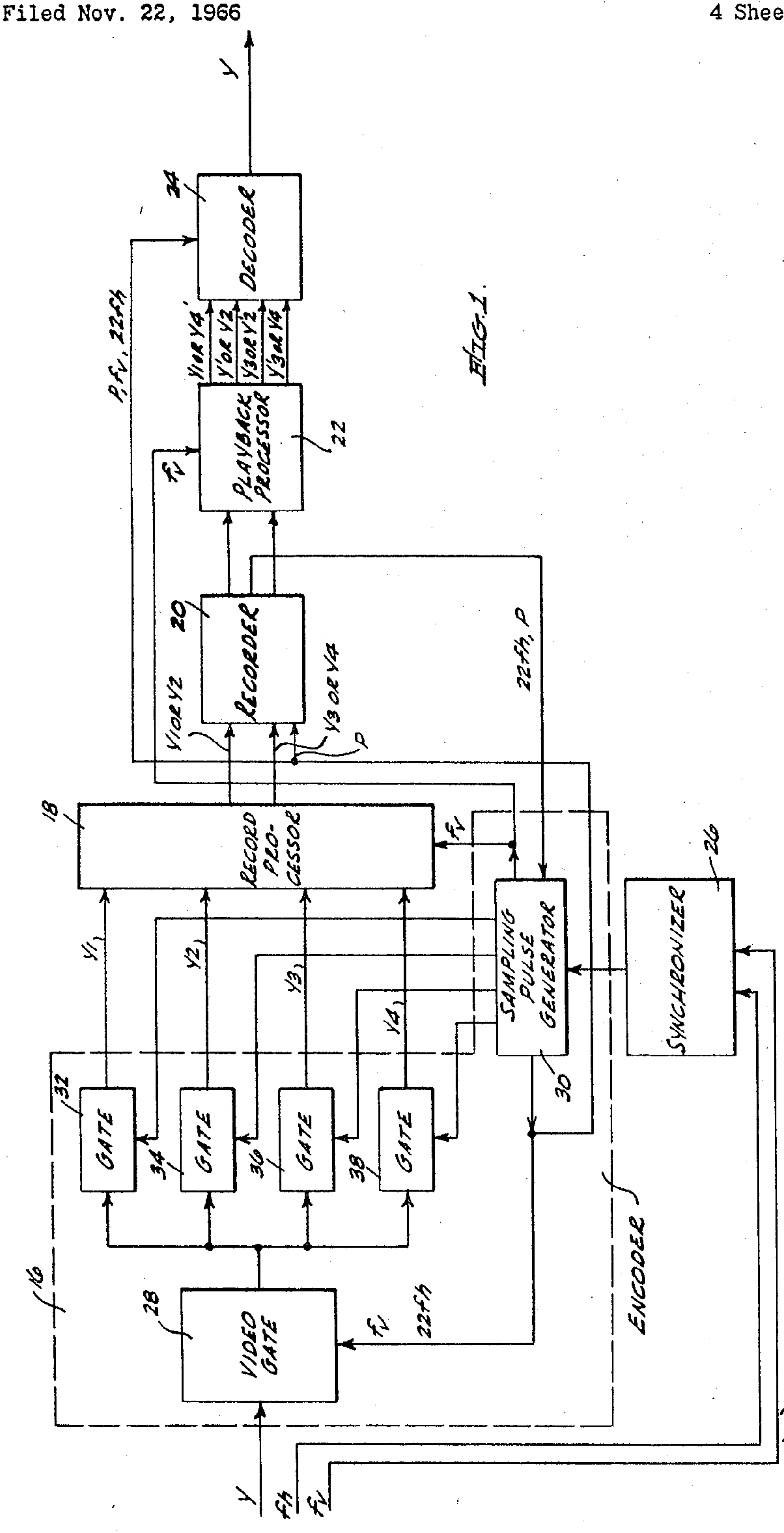
FIG. 1 is a block diagram of the improvements in the television system showing the relationship of a record processor and a playback processor to an encoder, a recorder, and a decoder.

Referring now to an embodiment of a VTR (video tape recorder) system, FIG. 1 illustrates a circuit in which the luminance signal Y is received from a convenient tap point in a television receiver (not shown) by an encoder circuit 16. The received luminance signal Y is sampled and encoded in a stable pattern and then fed on a plurality of parallel output channels as sampled data $Y_1$, $Y_2$, $Y_3$, and $Y_4$ to a record processor circuit 18. The record processor circuit 18 combines the four channels of sampled data signals so that only two channels of information, such as the channels carrying the odd-numbered information elements $Y_1$ and $Y_3$, are fed to the recorder 20 and recorded during one frame (two fields) and the channels carrying the even-numbered information bits $Y_2$ and $Y_4$ are fed to the recorder 20 during the next frame.

On playback, the previously recorded signals are received by a playback processor circuit 22, which processes and combines the signals so that the sampled data signals $Y_1$ thorugh $Y_4$ are each used twice—once as a real element (nondelayed) and once as an artificial element after nearly a one-line delay. For example, during each arbitrarily selected odd-numbered video frame, the odd-numbered real information elements or bits $Y_1$ and $Y_3$ and their related artificial information elements or bits, $Y'_1$ and $Y'_3$ are used to reconstruct the video signal. On the even-numbered frames, the even-numbered real information elements or bits $Y_2$ and $Y_4$ and their related artificial information elements or bits $Y'_2$ and $Y'_4$ are used to reconstruct the video signal. As a result, when the signals are processed by a decoder 24, the artificial elements effectively fill in what would otherwise be a blank space between real elements on the next horizontal video line, thereby giving higher resolution than would otherwise exist.

In describing the operation of the circuit illustrated in FIG. 1 in more detail, the encoder 16 can be of the type disclosed in my previously referenced copending patent application S.N. 563,763. By way of background, a synchronizer 26 is responsive to the vertical sync signal $f_v$ and the horizontal sync signal $f_h$ associated with the television video signal Y to produce a tone burst signal $22f_h$ and a vertical sync signal $f_v$. The luminance signal Y is fed to a video gate 28 wherein the tone burst signal of $22f_h$ generated by the synchronizer 26 is applied to the start of each field coincident with the vertical sync signal $f_v$. Thereafter this tone burst signal $22f_h$ can be utilized as a reference signal by the synchronizer 26 during playback as described in the previously referenced copending patent application S.N. 563,763.

In addition, the synchronizer generates sampling sync signals $f_s$ which are fed to a sampling pulse generator 30.

The sampling pulse generator 30 generates four sampling pulse trains which are fed to four parallel gates 32, 34, 36 and 38. The phases of the pulses of the individual sampling pulse trains are staggered so that the gates 32 through 38 are enabled sequentially for a short time. As a result, the luminance signal Y which is applied simultaneously to the gates 32 through 38 is sequentially conducted to the record processor 18 on four separate channels as four sampled data signals $Y_1$, $Y_2$, $Y_3$, and $Y_4$ in the pattern illustrated in FIG. 2. One preferred sampling pattern would be to make an average of 40⅓ samples per line in a pattern that is repeated after every three horizontal video lines.

The record processor 18 receives the sampled data signals $Y_1$, $Y_2$, $Y_3$, and $Y_4$ sequentially on four channels and processes them on a frame-by-frame basis so that during one frame, the odd-numbered sampled data $Y_1$ and $Y_3$ are fed to the recorder 20 on two output channels and during the next frame, the even-numbered sampled data signals $Y_2$ and $Y_4$ are fed to the recorder 20 on the two output channels.

Figure 3:
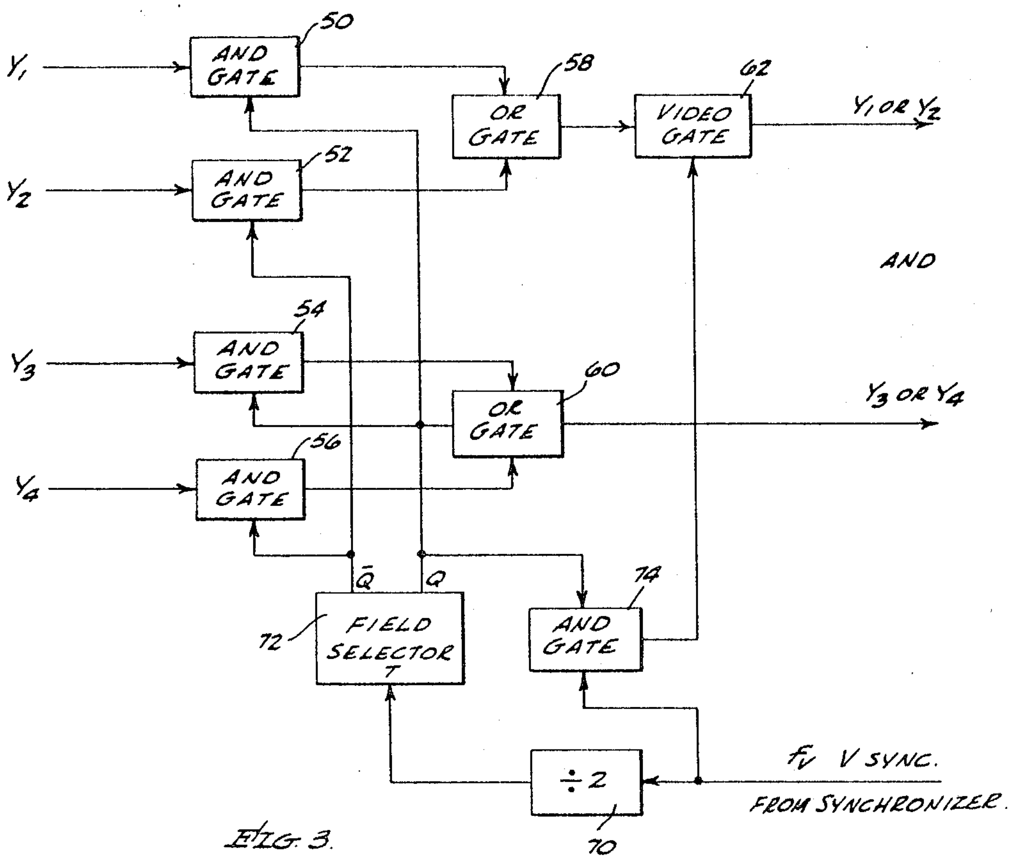
FIG. 3 is a schematic diagram of the record processor.

With regard to the details of the record processor 18, reference is made to the circuit illustrated in FIG. 3, which includes four parallel circuit branches, each branch having an AND gate 50, 52, 54, and 56, connected to receive the four sampled data signals $Y_1$, $Y_2$, $Y_3$, and $Y_4$, respectively. The AND gates and other circuit components hereinafter described have a corresponding circuit component disclosed in my previously referenced copending patent application S.N. 563,763. Consequently, reference to the copending patent application will not hereinafter be repeated for each circuit element. In operation, the AND gates 50 through 56 are enabled and inhibited on a frame-by-frame basis so that during a first arbitrarily selected frame (two fields), the AND gates 50 and 54 are enabled to conduct the sampled data signals $Y_1$ and $Y_3$ respectively to the OR gates 58 and 60, while the AND gates 52 and 56 are inhibited from conducting the sampled data signals $Y_2$ and $Y_4$. Consequently, the output from OR gates 58 and 60 are the sampled data signals $Y_1$ and $Y_3$ respectively, which are fed to the two output channels, one of which includes a video gate 62 that removes the tone burst signal 22$f_h$ from every other frame.

During the next frame, the AND gates 52 and 56 are enabled to conduct the sampled data signals $Y_2$ and $Y_4$ to the OR gates 58 and 60 respectively, while the AND gates 50 and 54 are inhibited from conducting the sampled data signals $Y_1$ and $Y_3$. As a result, the output from OR gates 58 and 60 are the sampled data signals $Y_2$ and $Y_4$ respectively, which are fed to the two output channels.

In order to attain this frame-by-frame switching operation, the vertical sync signal $f_v$ generated by the synchronizer 26 (FIG. 1) is fed to toggle a $\div 2$ circuit 70 such as a bistable multivibrator of the type described and illustrated in my previously referenced copending patent application S.N. 563,763. The $\div 2$ circuit 70 produces a desired output pulse edge once every frame which is fed to a field selector 72. The field selector 72 can be a bistable multivibrator of the type described in my previously referenced patent application which is toggled by the input signal so that a set output signal Q is at a predeterminal level during one frame duration and the clear output signal $\overline{Q}$ is at the predetermined output level during a subsequent frame, and so forth, in the same repetitive pattern. Thus, when the set output signal is at the predetermined level, the AND gates 50 and 54 are enabled, and when the reset output signal is at the predetermined level, the AND gates 52 and 56 are enabled.

In order to remove the tone burst signal 22$f_h$ from every other video frame, the video gate 62 is inhibited by an output signal from an AND gate 74 during the period of the vertical sync pulse $f_v$ during every other frame. In operation, one input to AND gate 74 is coupled to receive the set output signal Q from the field selector 72 while a second input to the AND gate 74 is coupled to receive the vertical sync pulse $f_v$ from the synchronizer 26 (FIG. 1). Thus, when there is coincidence between the two input signals to AND gate 74, an output signal is produced which is fed to the video gate 62. This output signal has the same duration as the vertical sync pulse $f_v$ and effectively inhibits the video gate 62 during this time period. As a result, the tone burst signal 22$f_h$, which would normally be conducted through the video gate 62 during this time period, is blocked and consequently is not recorded. During the next frame, the set output signal from the field selector 72 is at a second level and thus the AND gate 74 is inhibited from producing an output pulse when the vertical sync pulses $f_v$ are received at the other input terminal. Consequently, the video gate 62 will conduct the tone burst signal 22$f_h$, which is fed to the recorder 20.

The recorder 20 can be a multiple track recorder in which the tap and the recording heads travel linearly relative to one another at a tape speed of about 30 i.p.s. (inches per second). One tape recorder that could be used is disclosed in my previously referenced copending patent application S.N. 563,763.

On playback, the magnetic tape or recording medium is rerun past a multiple track playback head so that the two channels of video information, a pilot signal P, and the tone burst signal 22$f_h$ are reproduced. The two channels of sampled data are fed to the playback processor 22 while the pilot signal is fed to the synchronizer 26.

Figure 4:
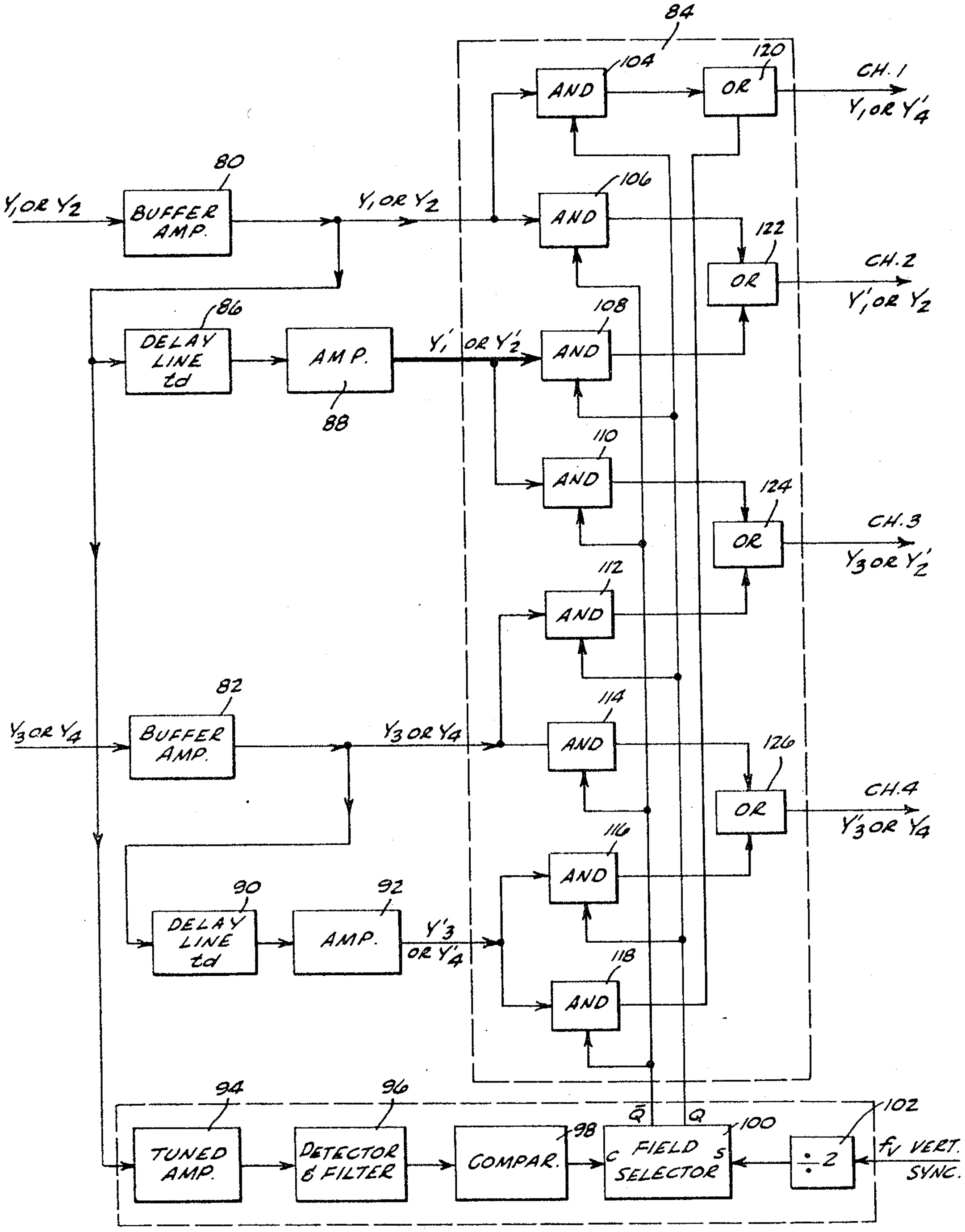
FIG. 4 is a schematic diagram of the playback processor.

With regard to the details of the playback processor 22, reference is made to the circuit illustrated in FIG. 4 in which the played-back sampled data is received on two input channels. For example, the sampled data signals $Y_1$ and $Y_3$ are received during one frame period, and the sampled data signals $Y_2$ an $Y_4$ are received during the next frame period, and so on in the same alternating pattern. The playback processor processes these signals in a unique manner, to be described shortly, and feeds them onto four output channels as real elements and artificial elements.

For example, during a first arbitrarily selected frame duration, the sampled data signal $Y_1$ is received on a first channel having a buffer amplifier 80 as an input element. During the time interval between each successive sampled data signal $Y_1$, a sampled data signal $Y_3$ is received on a second parallel channnel having a buffer amplifier 82 for an input element. The output signals from the buffer amplifiers are each further divided into two parallel circuit branches wherein the sampled data signals $Y_1$ and $Y_3$ are fed to a logic switch circuit 84 twice—once directly (nondelayed) and once after nearly one horizontal video line delay (63.4 microseconds). The branches which conduct the delayed sampled data signal $Y'_1$ or $Y'_3$ include, respectively, a delay line 86 which is connected in series circuit with an amplifier 88, and a delay line 90 connected in series with an amplifier 92.

Figure 5A:
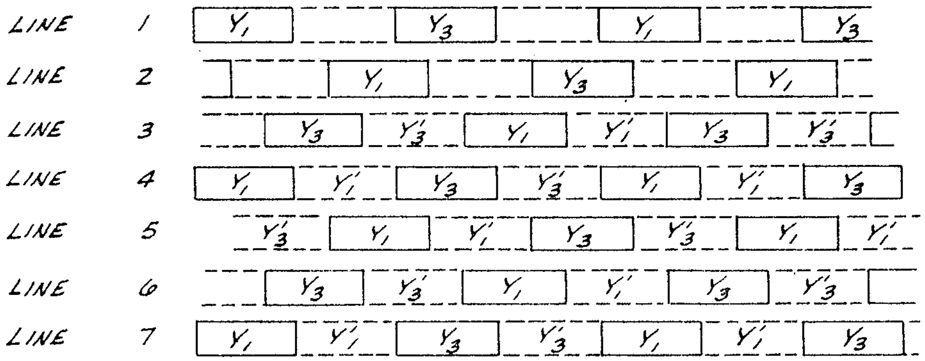
Figure 5B:
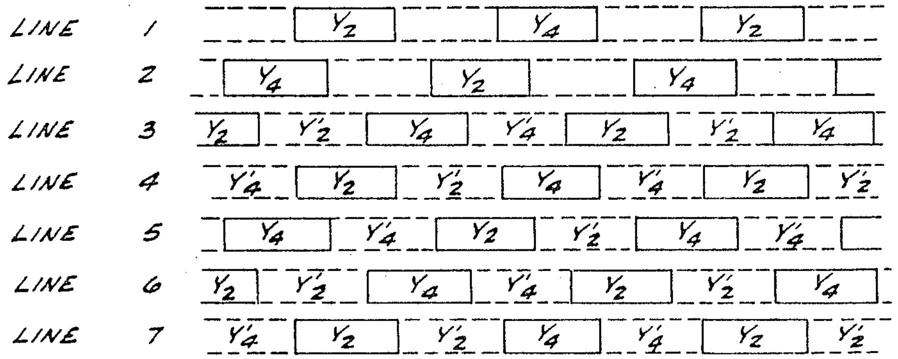

Since on the next frame, the sampled data signals $Y_2$ and $Y_4$ are processed in substantially the same manner as the sampled data signals $Y_1$ and $Y_3$, only the processing of the sampled data signals $Y_1$ and $Y_3$ will be described in detail with reference to the circuit of FIG. 4 and the graphical diagram of the sampling pattern illustrated in FIG. 5*a*.

With regard to the details of the signal processing operation of the playback processor 22, during a first frame the sampled data signal $Y_1$ processed by the buffer amplifier 80 also contains the tone burst signal 22$f_h$ which is utilized to switch the logic switch circuit 84 from a first operating state to a second operating state on a frame-by-frame basis. For example, the tone burst signal 22$f_h$ is received by a tuned amplifier 94 which is tuned to conduct the tone burst signal $22f_h$ and suppress all other signals. The output from the tuned amplifier 94 is received by a detector and filter circuit 96 which changes it to a single pulse signal of at least a predetermined amplitude. The pulse signal is fed to a comparator 98 which produces an output signal when the input pulse exceeds a threshold level therein. The output signal from the comparator 98 is fed to the clear input C of a field selector 100, switching the field selector to a first operating state in which the set signal Q is at a first operating level and the clear operating signal $\overline{Q}$ is a second level. In addition, at the start of the next frame, the field selecor 100 can be switched to its second operating state in which the set output signal Q is at the second level, and the clear output signal $\overline{Q}$ is at the first level. The set switching operation is provided by the vertical sync signal $f_v$ received from the synchronizer 26 (FIG. 1) which is fed through a $\div 2$ circuit 102 so a desired pulse edge of an output signal is produced only once every frame (two fields).

Assuming that when the comparator 98 produces an output signal in response to a tone burst signal $22f_h$, and the field selector 100 is in a first operating state in which the clear output signal $\overline{Q}$ is in an inhibitory level and the set output signal Q is at an enabling level, the logic switch circuit 84 is in a first operating state.

The logic switch 84 includes a plurality of AND gates 104 through 118 which are connected in parallel circuit relationship. These AND gates are connected in pairs, 104–106, 108–110, 112–114, and 116–118, to each parallel circuit branch and receive the nondelayed sampled data signals and the delayed sampled data signals. In operation, the AND gate pairs are responsive to the outputs from field selector 100 so that only one AND gate in each pair of AND gates is enabled and the other one is inhibited during each frame duration in an alternating sequence. For example, during the previously assumed operating condition, the AND gates 104, 108, 112 and 116 which are coupled to receive the set signal Q from field selector 100 are enabled to conduct the sampled video signal received by it. During this time, the AND gates 106, 110, 114 and 118 which are coupled to receive the clear output signal $\overline{Q}$ from the field selector 100 are inhibited from conducting the sampled data video signal received by them. As a result, only the enabled AND gates will conduct sampled data signals to the four OR gates 120, 122, 124, and 126, each associated with one of the four output channels.

For example, during the frame when the odd-numbered sampled data signals $Y_1$ and $Y_3$ are being played back, the nondelayed $Y_1$ signal will be conducted through AND gate 104 and OR gate 120 to the first output channel, in accordance with the pattern illustrated in FIG. *5a*. Since this nondelayed signals $Y_1$ is fed out at its proper or real time, it can be referred to as a real element. At the same time the sampled data signal $Y_1$ is being fed out on channel 1, it is being fed into the delay line 86 and will subsequently emerge after nearly a one-line delay (63.4 microseconds) as a delayed sampled data signal $Y'_1$ which is utilized as an artificial element in place of a $Y_2$ signal, as will be explained in more detail shortly.

Assuming, then, that there is no past history of sampled data signals being received, the elongate area corresponding to the sampled data signal $Y_2$ (FIG. 2) is blank, as illustrated in line 1 of FIG. *5a*. During the next time period, the sampled data signal $Y_3$ is conducted through the enabled AND gate 112 and OR gate 124 to the third output channel as a real element. At the same time the sampled data signal $Y_3$ is being fed into the delay line 90 and will also emerge after nearly a one-line delay (63.4 microseconds) as an artificial element $Y'_3$.

Figure 2:
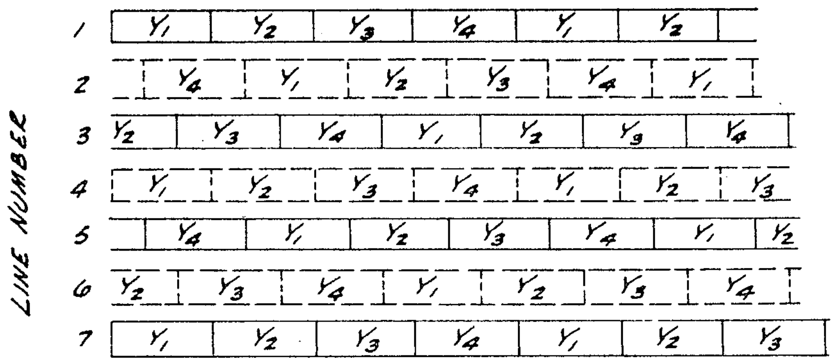
FIG. 2 is a graphical illustration showing a preferred sampling pattern of a portion of a video picture in which individual information bits are illustrated as rectangles that are converted to electrical signals by the encoder and are reduced in bandwidth by the recording processor.

Again assuming that there is no past history of sampled data signals, the time period corresponding to the elongate sampled data area $Y_4$ illustrated in FIG. 2 is blank as illustrated in FIG. *5a*.

Thereafter, this alternate sequence of real sampled data elements $Y_1$ and $Y_3$ alternately occur on channels 1 and 3 for the rest of the first horizontal video line.

On the second line of the first field (line 3), the delayed sampled data signal $Y'_1$ associated with the real element $Y_1$ of line 1 emerges from the delay line 86 and is fed through the amplifier 88, the enabled AND gate 108, and the OR gate 122 to the second output channel as an artificial element $Y'_1$ that replaces the missing even-numbered sampled data signal $Y_2$.

Immediately after the artificial element $Y'_1$ time period ends, the first real element on line 3 which is the sampled data signal $Y_3$ is conducted through the enabled AND gate 112 and OR gate 124 and appears on the third output channel. At the end of this time period associated with the real element $Y_3$, an artificial element $Y'_3$, corresponding to the real element $Y_3$ of line 1, emerges from the delay line 90 and is fed through the amplifier 92, the enabled AND gate 116, and the OR gate 126, and appears on the fourth output channel as the artificial element $Y'_3$ in place of the real element $Y_4$.

A closer look at FIG. *5a* will show that although the artificial elements $Y'_1$ and $Y'_3$ are displaced vertically two lines from their real positions, they are in substantial vertical registry for the reconstructed video picture as they appear on the output channel. Consequently, they tend to give higher resolution than would occur if the spaces they fill were left blank. Thus, while the instantaneous bandwidth requirement of the video signal has been reduced by two to one, the resolution of the picture is not reduced two to one.

The same processing pattern is repeated on the second field of the first frame, as illustrated on the even-numbered lines of FIG. *5a*, wherein each sampled data signal $Y_1$ and $Y_3$ is utilized twice—once without a delay and once after nearly a one-line delay.

On the next frame, the output from the $\div 2$ circuit 102 switches the state of field selector 100 so that the level of the set signal Q inhibits AND gates 104, 108, 112, and 116 while the level of the clear output signal $\overline{Q}$ enables the AND gates 106, 110, 114, and 118. Consequently, the played-back sampled data signal $Y_2$ and $Y_4$ will be processed by the playback processor and fed out of the four output channels in the sequence illustrated graphically in FIG. *5b*. In this case, the delayed artificial elements $Y'_2$ and $Y'_4$ will be used to replace the missing odd-numbered sampled data signals $Y_1$ and $Y_3$. In effect, the artificial $Y'_4$ will appear on channel 1 in place of the element $Y_1$, the real element $Y_2$ will appear on channel 2, the artificial $Y'_2$ will appear on channel 3 in place of the real element $Y_3$, and the real element $Y_4$ will appear on channel 4, in that respective sequence, as illustrated on line 3, etc., of FIG. *5b*.

The decoder 24, illustrated in FIG. 1, is coupled to receive the four channels of video information from the playback processor 22 and reconstructs the information into a composite video signal in the manner disclosed in my previously referenced copending patent application Ser. No. 563,763, wherein the odd-numbered real elements $Y_1$ and $Y_3$ and the corresponding artificial elements $Y'_1$ and $Y'_3$ are used to reconstruct the video picture for every arbitrarily selected odd-numbered frame and the even-numbered real elements $Y_2$ and $Y_4$ and their corresponding artificial elements, $Y'_2$ and $Y'_4$ are used to reconstruct the video picture on the associated even-numbered frames.

While the operation of the preferred embodiment has been described with reference to frame-by-frame switching (two fields), it may also be possible to utilize select numbers of fields other than two fields.

While the salient features have been illustrated and described with respect to a particular embodiment, it should be readily apparent that modifications can be made within the spirit and scope of the invention, and it is therefore not desired to limit the invention to the exact details shown and described.

What is claimed is:

1. In a television system of the type in which video information is sequentially sampled in a pattern of information bits that is repeated every X horizontal lines, an improvement therein of:

means responsive to a base frequency signal of the video information for generating enable signals and inhibit signals; and gate means coupled to receive the sequentially sampled video information bits and coupled to receive the enable signals and the inhibit signals for processing the received information bits in response to the enable signals and inhibit signals by conducting ing only evenly-spaced ones of the information bits during a select number of video fields.

2. The combination of claim 1 in which said gate means is further responsive to the enable and inhibit signals for conducting the information bits during alternating select number of video fields, which information bits are positioned in the alternating select number of video fields between the bits of video information conducted during every other select number of video fields.

3. The combination of claim 1 in which said gate means is responsive to the enable signals and inhibit signals for conducting the spaced information bits during a select number of video fields equal to two video fields.

4. The combination of claim 2 in which said gate means is responsive to the enable signals and inhibit signals for conducting the spaced information bits during a select number of video fields equal to two video fields.

5. The system of claim 1 in which said gate means includes a plurality of parallel input channels coupled to receive sequentially the bits of sampled video information in a recurring sequence, said gate means processing the received information bits onto a number of parallel output channels which is less than the number of input channels.

6. The system of claim 5 in which said plurality of parallel input channels equals four in number, and the number of said parallel output channels equals two in number.

7. The system of claim 1 further including:

second means coupled to receive the conducted, evenly-spaced information bits for feeding the information bits over a first circuit path without a delay as real information elements and over a second circuit path with a delay as artificial information elements; and second gate means coupled to receive the real information elements and the artificial information elements for conducting the real information elements to an output as spaced real information elements and for conducting the artificial information elements to the output during the time interval between spaced-apart real information elements of a subsequent horizontal video line.

8. The system of claim 7 in which said second means is operable to delay the information bits nearly one horizontal video line.

9. The system of claim 8 in which said second means is operable to delay the information bits for about 63.4 microseconds.

10. The system of claim 1 further including:

recorder means coupled to receive and record the conducted, evenly-spaced information bits from said gate means.

11. The system of claim 5 further including:

recorder means coupled to receive and record the conducted, evenly-spaced information bits from said gate means.

12. The system of claim 6 further including:

recorder means coupled to receive and record the conducted, evenly-spaced information bits from said gate means.

13. The system of claim 7 further including:

recorder means coupled to receive and record the conducted, evenly-spaced information bits from said gate means and to feed the recorded information bits to said second means.

14. The system of claim 8 further including:

recorder means coupled to receive and record the conducted, evenly-spaced information bits from said gate means and to feed the recorded information bits to said second means.

15. In a television system of the type in which video information is sequentially sampled in a pattern of information bits that is repeated every X video lines, an improvement therein of:

means responsive to a base frequency signal of the video information for generating enable signals and inhibit signals; and gate means coupled to receive the sequentially sampled video information and coupled to receive the enable signals and inhibit signals for processing the received video information in an alternating sequence by first conducting only odd-numbered bits of sampled information to output channel means during a select number of video fields and then conducting only even-number bits of video information to said output channel means during a select number of video fields.

16. The system of claim 15 in which the first said means generates enable signals and inhibit signals on a frame-by-frame basic and said gate means is responsive to said enable signals and said inhibit signals for conducting only odd-numbered bits of sampled information to the output channel means during every other video frame and conducts even-numbered bits of video information to the output means during the video frames between the frames when odd-numbered bits of sampled information are conducted.

17. The system of claim 15 further including: recorder means coupled to receive and record the conducted bits of sampled video information from said output channel means of said gate means.

18. The system of claim 16 further including: recorder means coupled to receive and record the conducted bits of sampled video information from said output channel means of said gate means.

19. The system of claim 15 further including:

first circuit means coupled to receive the spaced bits of sampled information from said gate means for conducting the bits directly to an output as real information elements; and second circuit means coupled to receive the spaced bits of sampled information from said gate means for delaying the bits of information and conducting the delayed bits of information to an output during the time interval between real elements on a subsequent horizontal video line as artificial elements.

20. The system of claim 19 in which said second circuit means delays the information bits for about one horizontal video line.

21. The system of claim 19 in which said second circuit means delays the information bits for about 63.4 microseconds.

22. The system of claim 19 further including:

third means responsive to a base frequency of the conducted signal for generating enable signals and inhibit signals; and said first circuit means and said second circuit means being responsive, including gate means responsive to the enable signals and inhibit signals for conducting the odd-numbered information bits and delayed and related artificial information element during every odd-numbered frame and for conducting the even-numbered real element and associated artificial element during every even-numbered video frame.

23. The combination of claim 22 further including: recorder means coupled to receive and record the conducted bits of sampled information received from the first said gate means and to feed the recorded information to said first circuit means and said second circuit means.

24. In a television system of the type in which video information is sequentially received in sampled patterns of spaced bits that are repeated every X video lines, an improvement therein of:

first circuit means coupled to receive the spaced bits of sampled information for conducting the bits directly to an output as real information elements; and second circuit means coupled to receive the spaced bits of sampled information for delaying the bits of information and for conducting the delayed bits to an output during the time interval between real elements on a subsequent line as artificial elements.

25. In the system of claim 24 in which said second circuit means delays the bits of information for about the time interval of about one horizontal video line.

26. In the system of claim 24, in which there are 40⅓ sample intervals per horizontal video line, and said second circuit means is operable to delay the bits of information for about 63.4 microseconds.

27. In a television system of the type in which video information is received sequentially on a first and a second input channel in a sampled pattern that is repeated every X horizontal video lines, the sampled pattern being composed of every odd-numbered information bit during every odd-numbered video frame, and every even numbered information bit during every even-numbered video frame, an improvement therein of:

first circuit means and second circuit means, each connected to sequentially receive the bits of video information from the first input channels and from the second input channels, respectively; and said first circuit means and said second circuit means further including, a first circuit branch coupled to receive the information signals from an input channel for feeding the received information signals directly to an output terminal as real information elements, and a delay circuit branch coupled to receive the information signals from the input channel for delaying the information signals for about one horizontal video line and for feeding the delayed information signal to an output terminal as an artificial information element during the time interval between sequential real information elements.

28. The system of claim 26 further including:

means responsive to a base frequency of the received video information for generating enable signals and inhibit signals; and said first circuit means and said second circuit means further including gate means having a plurality of input terminals, each connected to one of said output terminals of an individual one of said circuit branches, said gate means being responsive to the enable signals and the inhibit signals for conducting the odd-numbered real information elements and the odd-numbered artificial information elements to an output means during the odd-numbered select numbers of video fields and for conducting the even-numbered real information elements and the even-numbered artificial information elements to said output during every even-numbered select number of fields.

29. The system of claim 28 in which said select number of fields equal two, whereby said enable signals and inhibit signals are generated on a frame-by-frame basis.

References Cited

UNITED STATES PATENTS

| | | | |
|---|---|---|---|
| 2,906,816 | 9/1959 | Kretzmer | 178—6.8 |
| 3,359,936 | 12/1967 | Kihara | 178—5.4 |
| 3,366,739 | 1/1968 | Parkinson | 179—15.55 |

RICHARD MURRAY, Primary Examiner

R. K. ECKERT, Jr., Assistant Examiner

U.S. Cl. X.R.

178—6.6; 179—15.55; 328—34, 41, 151